US009864800B2

(12) United States Patent
Wang et al.

(10) Patent No.: US 9,864,800 B2
(45) Date of Patent: Jan. 9, 2018

(54) METHOD AND SYSTEM FOR IDENTIFICATION OF DISTRIBUTED BROADCAST CONTENT (71) Applicant: Shazam Entertainment Limited, London (GB)

(72) Inventors: Avery Li-Chun Wang, Palo Alto, CA (US); Chee Wong, Wimbledon (GB); Jonathan Symons, Hants (GB)

(73) Assignee: Shazam Entertainment, Ltd., London (GB)

( * ) Notice: Subject to any disclaimer, the term of this patent is extended or adjusted under 35 U.S.C. 154(b) by 0 days.

(21) Appl. No.: 14/672,881

(22) Filed: Mar. 30, 2015

(65) Prior Publication Data

US 2015/0205865 A1    Jul. 23, 2015

Related U.S. Application Data (63) Continuation of application No. 13/868,708, filed on Apr. 23, 2013, now Pat. No. 9,361,370, which is a
(Continued)

(51) Int. Cl.
*H04M 3/493* (2006.01)
*G06F 17/30* (2006.01)
(Continued)

(52) U.S. Cl.
CPC ....... *G06F 17/30743* (2013.01); *H04H 60/37* (2013.01); *H04H 60/40* (2013.01);
(Continued)

(58) Field of Classification Search
CPC ......... G06F 17/30743; G06F 17/30758; G06F 17/30017; G06F 17/3002; G06F 17/30029;
(Continued)

(56) References Cited

U.S. PATENT DOCUMENTS 4,843,562 A    6/1989 Kenyon et al.
5,210,820 A    5/1993 Kenyon
(Continued)

FOREIGN PATENT DOCUMENTS

EP        1 659 714        5/2006
WO    WO 02/11123        1/2002
(Continued)

OTHER PUBLICATIONS

International Search Report issued by the European Patent Office for PCT/US07/080292, dated Feb. 28, 2008.
(Continued)

*Primary Examiner* — Md Talukder
(74) *Attorney, Agent, or Firm* — McDonnell Boehnen Hulbert & Berghoff LLP (57)    ABSTRACT A method and system of performing high-throughput identifications of broadcast content is provided. A device can send a content identification query, which includes a sample of content being broadcast, to a server to request an identity of the content. The server will perform a computational identification of the content, return the result to the device, and store the result. For all subsequently received content identification queries requesting an identity of content being broadcast from the same source and in a time during which the content is still being broadcast from the source, the server will send the stored content identification in response to the subsequent queries. If a subsequent content identification query does not request the identity of content being broadcast from the same source or is not received during the time that the content is still being broadcast, the server will perform a computational identification of a content sample.

26 Claims, 5 Drawing Sheets

Related U.S. Application Data continuation of application No. 13/309,222, filed on Dec. 1, 2011, now Pat. No. 8,442,426, which is a continuation of application No. 12/976,050, filed on Dec. 22, 2010, now Pat. No. 8,086,171, which is a continuation of application No. 11/866,814, filed on Oct. 3, 2007, now Pat. No. 7,881,657.

(60) Provisional application No. 60/848,941, filed on Oct. 3, 2006.

(51) Int. Cl.
| | | |
|---|---|---|
| *H04H 60/37* | (2008.01) | |
| *H04H 60/40* | (2008.01) | |
| *H04N 21/44* | (2011.01) | |
| *H04H 60/42* | (2008.01) | |
| *H04H 60/58* | (2008.01) | |
| *H04H 60/74* | (2008.01) | |

(52) U.S. Cl.
CPC ............. *H04N 21/44* (2013.01); *H04H 60/42* (2013.01); *H04H 60/58* (2013.01); *H04H 60/74* (2013.01); *H04H 2201/30* (2013.01)

(58) Field of Classification Search
CPC ......... G06F 17/30026; G06F 17/30053; G06F 17/30699; G06F 17/30902; G06F 17/30828; H04H 60/58; H04H 60/37; H04H 20/71; H04H 2201/50; H04H 2201/90; H04H 60/40; H04H 60/42; H04H 60/73; H04H 60/91; Y10S 707/99933; Y10S 707/99945; Y10S 707/99948; G06Q 30/0261; G06Q 30/0269; H04N 21/4394; H04N 21/44204; H04N 21/462; H04N 21/812; H04N 5/44
USPC ...................................... 455/414.2
See application file for complete search history.

(56) References Cited

U.S. PATENT DOCUMENTS

| | | | |
|---|---|---|---|
| 6,408,128 | B1 | 6/2002 | Abecassis |
| 6,714,594 | B2 | 3/2004 | Dimitrova et al. |
| 7,171,018 | B2 | 1/2007 | Rhoads et al. |
| 7,881,657 | B2 | 2/2011 | Wang et al. |
| 8,086,171 | B2 | 12/2011 | Wang et al. |
| 8,442,426 | B2 | 5/2013 | Wang et al. |
| 9,047,371 | B2 * | 6/2015 | Mohajer ........... G06F 17/30743 |
| 2002/0082731 | A1 | 6/2002 | Pitman et al. |
| 2002/0083060 | A1 | 6/2002 | Wang et al. |
| 2002/0178410 | A1 | 11/2002 | Haitsma et al. |
| 2003/0021441 | A1 | 1/2003 | Levy et al. |
| 2003/0086341 | A1 * | 5/2003 | Wells ................ G06F 17/30017 369/13.56 |
| 2004/0252604 | A1 * | 12/2004 | Johnson ............ G06F 17/30772 369/47.22 |
| 2005/0091268 | A1 | 4/2005 | Meyer |
| 2005/0176366 | A1 | 8/2005 | Levy |
| 2005/0193016 | A1 | 9/2005 | Seet et al. |
| 2005/0197724 | A1 | 9/2005 | Neogi |
| 2006/0106867 | A1 * | 5/2006 | Burges ............. G06F 17/30026 |
| 2006/0165375 | A1 | 7/2006 | Choi et al. |
| 2007/0143788 | A1 | 6/2007 | Abernety et al. |
| 2008/0049704 | A1 * | 2/2008 | Witteman .............. H04H 60/58 370/342 |
| 2008/0051029 | A1 * | 2/2008 | Witteman .............. G11B 27/28 455/17 |
| 2008/0208613 | A1 | 8/2008 | Scibora |
| 2008/0313050 | A1 | 12/2008 | Basir |
| 2009/0043870 | A1 | 2/2009 | Ikezoye et al. |
| 2009/0077220 | A1 | 3/2009 | Svendsen et al. |
| 2009/0077578 | A1 | 3/2009 | Steuer et al. |
| 2009/0290852 | A1 | 11/2009 | Wright |
| 2012/0095958 | A1 * | 4/2012 | Pereira ................ G06F 17/3002 707/609 |
| 2012/0239175 | A1 | 9/2012 | Mohajer et al. |
| 2013/0247082 | A1 | 9/2013 | Wang |
| 2013/0290502 | A1 * | 10/2013 | Bilobrov ................ G06F 21/10 709/223 |
| 2014/0325555 | A1 * | 10/2014 | Khader ............. H04N 21/2668 725/32 |
| 2015/0205865 | A1 * | 7/2015 | Wang .................... H04H 60/37 707/758 |

FOREIGN PATENT DOCUMENTS

| | | |
|---|---|---|
| WO | WO 02/065782 | 8/2002 |
| WO | WO 03/091990 | 10/2003 |
| WO | WO 03/091899 | 11/2003 |
| WO | WO 2005/079499 | 9/2005 |
| WO | WO 2005/101998 | 11/2005 |

OTHER PUBLICATIONS

International Preliminary Report on Patentability and Written Opinion of the International Searching Authority for PCT/US07/080292, dated Apr. 7, 2009.

\* cited by examiner

METHOD AND SYSTEM FOR IDENTIFICATION OF DISTRIBUTED BROADCAST CONTENT

CROSS-REFERENCE TO RELATED APPLICATIONS

The present patent application claims priority under 35 U.S.C. §119(e) to U.S. Provisional Patent Application Ser. No. 60/848,941, filed on Oct. 3, 2006, the entirety of which is herein incorporated by reference. The present patent application also claims priority to U.S. patent application Ser. No. 11/866,814, filed on Oct. 3, 2007, the entirety of which is herein incorporated by reference. The present patent application also claims priority to U.S. patent application Ser. No. 12/976,050, filed on Dec. 22, 2010, the entirety of which is herein incorporated by reference. The present patent application also claims priority to U.S. patent application Ser. No. 13/309,222, filed on Dec. 1, 2011, the entirety of which is herein incorporated by reference. The present patent application also claims priority to U.S. patent application Ser. No. 13/868,708, filed on Apr. 23, 2013, the entirety of which is herein incorporated by reference.

FIELD OF INVENTION

The present invention generally relates to identifying content within broadcasts, and more particularly, to identifying information about segments or excerpts of content within a data stream.

BACKGROUND

As industries move toward multimedia rich working environments, usage of all forms of audio and visual content representations (radio broadcast transmissions, streaming video, audio canvas, visual summarization, etc.) becomes more frequent. Whether a user, content provider, or both, everybody searches for ways to optimally utilize such content. For example, one method that has much potential for creative uses is content identification. Enabling a user to identify content that the user is listening to or watching offers a content provider new possibilities for success.

Content identification may be used in a service provided for a consumer device (e.g., a cell phone), which includes a broadcast receiver, to supply broadcast program metadata to a user. For example, title, artist, and album information can be provided to the user on the device for broadcast programs as the programs are being played on the device. Existing systems to provide content information of a broadcast signal to a user may only provide limited metadata, as with a radio data signal (RDS). In addition, existing systems may not be monitoring every broadcast station in every locale, and a desired radio station mapping may not always be available.

Still further, other existing systems may require the consumer device to sample/record a broadcast program and to send the sample of the broadcast program to a recognition server for direct identification. A computational cost to perform a recognition on one media sample may be small, however, when considering that potentially many millions of consumer devices may be active at the same time, and if each were to query the server once per minute, the recognition server would have to be able to perform millions of recognitions every minute, and then the computational cost becomes significant. Such a system may only be able to allow a time budget of a few microseconds or less per recognition request, which is a few orders of magnitude smaller than typical processing times for media content identification. Furthermore, since broadcast media is often presented as a continuous stream without segmentation markers, in order to provide matching program metadata that is timely and synchronized with current program, a brute-force sample and query method could require fine granularity sampling intervals, thus increasing required query load even more.

In the field of broadcast monitoring and subsequent content identification, it is desirable to identify as much audio content as possible, within every locale, while minimizing effort expended. The present application provides techniques for doing so.

SUMMARY

Within embodiments disclosed herein, a method of identifying content within a data stream is provided. The method includes receiving a content identification query from a client device that requests an identity of content that was broadcast from a broadcast source. If content from the broadcast source has previously been identified and if the content identification query has been received at a time during which the content is still being broadcast from the source, the method includes sending the previous identification of the content to the client device. However, if not, the method includes (i) performing a content identification using a sample of the content broadcast from the broadcast source, and (ii) storing the content identification.

In another embodiment, the method includes receiving a content identification query from a client device that requests an identity of content being broadcast from a broadcast source and including information pertaining to the broadcast source of the content. The method also includes accessing a cache including a listing of content identifications that were each generated using a content sample, and each listing includes information pertaining to identity of content broadcast from a plurality of broadcast sources and each item in the listing including (i) an identity of given content, (ii) an identity of a given broadcast source that broadcast the given content, and (iii) an indication of when the content identification is valid. The method also includes matching the broadcast source of the content to a broadcast source of one of the content samples from which any of the content identifications were generated, and if the content identification query was received during a time in which the content identification in the listing pertaining to the one of the content samples is still valid, sending the content identification in the listing pertaining to the one of the content samples to the client device in response to the content identification query.

In still another embodiment, the method includes receiving a first content identification query from a first client device that includes a recording of a sample of content being broadcast from a first source, making a content identification using the sample of the content, determining a time during which the content will be or is being broadcast from the first source, and storing the content identification, the time, and information pertaining to the first source of the content in a cache. The method also includes receiving a second content identification query from a second client device that requests an identity of content being broadcast from a second source and including information pertaining to the second source of the content. The method further includes if the first source and the second source are the same and if the time has not expired, (i) sending the content identification made in response to the first content identification query to the second client device in response to the second content identification query, and if not, (ii) making a second content identification using a sample of the content being broadcast from the second source and storing the second content identification in the cache.

These as well as other features, advantages and alternatives will become apparent to those of ordinary skill in the art by reading the following detailed description, with appropriate reference to the accompanying drawings.

DETAILED DESCRIPTION

Within exemplary embodiments described below, a method for identifying content within data streams is provided. The method may be applied to any type of data content identification. In the following examples, the data is an audio data stream. The audio data stream may be a real-time data stream or an audio recording, for example.

Exemplary embodiments describe methods for identifying content by identifying a source (e.g., channel, stream, or station) of the content transmission, and a location of a device requesting the content identification. For example, it may be desirable to detect from a free-field audio sample of a radio broadcast which radio station a user is listening to, as well as to what song the user is listening. Exemplary embodiments described below illustrate a method and apparatus for identifying a broadcast source of desired content, and for identifying content broadcast from the source. In one embodiment, a user can utilize an audio sampling device including a microphone and optional data transmission means to identify content from a broadcast source. The user may hear an audio program being broadcast from some broadcast means, such as radio or television, and can record a sample of the audio using the audio sampling device. The sample, broadcast source information, and optionally a location of the audio sampling device are then conveyed to an analyzing means to identify the content. Content information may then be reported back to the user.

The identity and information within a query (broadcast source information and optionally location information) are then stored. If second user then subsequently sends a content identification query for the same broadcast source and the query is received within a given time frame, then the stored content identity can be returned as a result to the second user. The query would need to be received during a time in which the same song is being broadcast on by the same broadcast source, so that the second user would effectively be asking to identify the same song that was previously identified in response to the first query. In this manner, for all queries received after a first query, during a broadcast of the song for which the query pertains, and pertaining to the same broadcast source, the response to the first query (which is stored) can be returned to all subsequent queries. As a result, only one computational content identification is needed to be performed, because the result can be stored for later retrieval, if subsequent content queries satisfy the requirements (e.g., if subsequent content queries are considered to be for the same song).

Figure 1:
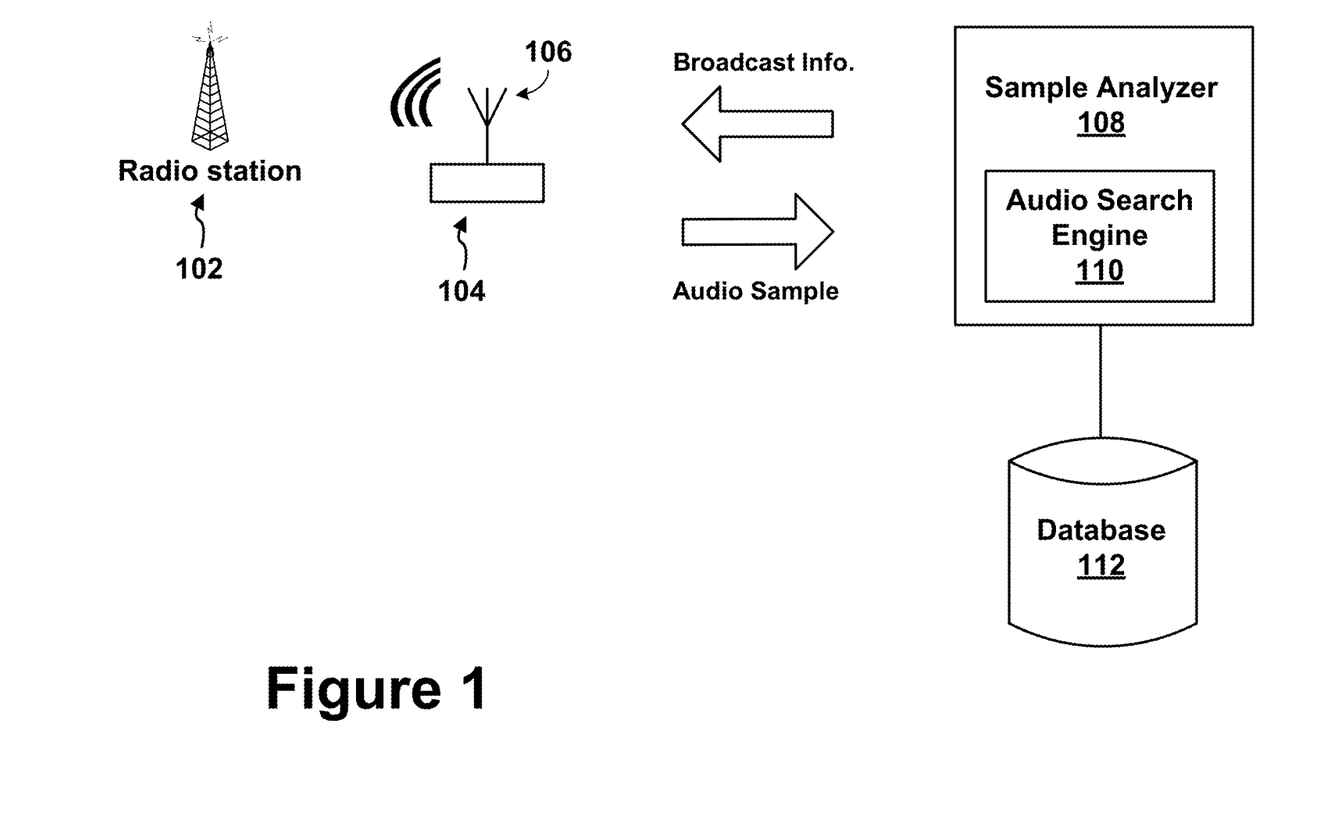
FIG. 1 illustrates one example of a system for identifying content within an audio stream.

Referring now to the figures, FIG. 1 illustrates one example of a system for identifying content within other data content, such as identifying a song within a radio broadcast. The system includes radio stations, such as radio station 102, which may be a radio or television content provider, for example, that broadcasts audio streams and other information to a receiver 104. The receiver 104 receives the broadcast radio signal using an antenna 106 and converts the signal into sound. The receiver 104 may be a component within any number of consumer devices, such as a portable computer or cell phone. The receiver 104 may also include a conventional AM/FM tuner and other amplifiers as well to enable tuning to a desired radio broadcast channel.

The receiver 104 can record portions of the broadcast signal (e.g., audio sample) for identification. The receiver 104 can send over a wired or wireless link a recorded broadcast to a sample analyzer 108 that will identify information pertaining to the audio sample, such as track identities (e.g., song title, artist, or other broadcast program information). The sample analyzer 108 includes an audio search engine 110 and may access a database 112 containing audio sample and broadcast information, for example, to compare the received audio sample with stored information so as to identify tracks within the received audio stream. Once tracks within the audio stream have been identified, the track identities or other information may be reported back to the receiver 104.

Alternatively, the receiver 104 may receive a broadcast from the radio station 102, and perform some initial processing on a sample of the broadcast so as to create a fingerprint of the broadcast sample. The receiver 104 could then send the fingerprint information to the sample analyzer 108, which will identify information pertaining to the sample based on the fingerprint alone. In this manner, more computation or identification processing can be performed at the receiver 104, rather than at the sample analyzer 108.

The database 112 may include many recordings and each recording has a unique identifier (e.g., sound_ID). The database 112 itself does not necessarily need to store the audio files for each recording, since the sound_IDs can be used to retrieve audio files from elsewhere. A sound database index may be very large, containing indices for millions or even billions of files, for example. New recordings can be added incrementally to the database index.

The system of FIG. 1 allows songs to be identified based on stored information. While FIG. 1 illustrates a system that has a given configuration, the components within the system may be arranged in other manners. For example, the audio search engine 110 may be separate from the sample analyzer 108, or audio sample processing can occur at the receiver 104 or at the sample analyzer 108. Thus, it should be understood that the configurations described herein are merely exemplary in nature, and many alternative configurations might also be used.

The system in FIG. 1, and in particular the sample analyzer 108, identifies content within an audio stream using samples of the audio within the audio stream. Various audio sample identification techniques are known in the art for performing computational content identifications of audio samples and features of audio samples using a database of audio tracks. The following patents and publications describe possible examples for audio recognition techniques, and each is entirely incorporated herein by reference, as if fully set forth in this description.

Kenyon et al, U.S. Pat. No. 4,843,562, entitled "Broadcast Information Classification System and Method"

Kenyon, U.S. Pat. No. 5,210,820, entitled "Signal Recognition System and Method"

Haitsma et al, International Publication Number WO 02/065782 A1, entitled "Generating and Matching Hashes of Multimedia Content"

Wang and Smith, International Publication Number WO 02/11123 A2, entitled "System and Methods for Recognizing Sound and Music Signals in High Noise and Distortion"

Wang and Culbert, International Publication Number WO 03/091990 A1, entitled "Robust and Invariant Audio Pattern Matching"

Wang, Avery, International Publication Number W05/079499 (also published as U.S. Pat. No. 7,986,913), entitled "Method and Apparatus for identification of broadcast source"

Briefly, identifying features of an audio recording begins by receiving the recording and sampling the recording at a plurality of sampling points to produce a plurality of signal values. A statistical moment of the signal can be calculated using any known formulas, such as that noted in U.S. Pat. No. 5,210,820, for example. The calculated statistical moment is then compared with a plurality of stored signal identifications and the recording is recognized as similar to one of the stored signal identifications. The calculated statistical moment can be used to create a feature vector that is quantized, and a weighted sum of the quantized feature vector is used to access a memory that stores the signal identifications.

In another example, generally, audio content can be identified by identifying or computing characteristics or fingerprints of an audio sample and comparing the fingerprints to previously identified fingerprints. The particular locations within the sample at which fingerprints are computed depend on reproducible points in the sample. Such reproducibly computable locations are referred to as "landmarks." The location within the sample of the landmarks can be determined by the sample itself, i.e., is dependent upon sample qualities and is reproducible. That is, the same landmarks are computed for the same signal each time the process is repeated. A landmarking scheme may mark about 5-10 landmarks per second of sound recording; of course, landmarking density depends on the amount of activity within the sound recording. One landmarking technique, known as Power Norm, is to calculate the instantaneous power at many time points in the recording and to select local maxima. One way of doing this is to calculate the envelope by rectifying and filtering the waveform directly. Another way is to calculate the Hilbert transform (quadrature) of the signal and use the sum of the magnitudes squared of the Hilbert transform and the original signal. Other methods for calculating landmarks may also be used.

Once the landmarks have been computed, a fingerprint is computed at or near each landmark time point in the recording. The nearness of a feature to a landmark is defined by the fingerprinting method used. In some cases, a feature is considered near a landmark if it clearly corresponds to the landmark and not to a previous or subsequent landmark. In other cases, features correspond to multiple adjacent landmarks. The fingerprint is generally a value or set of values that summarizes a set of features in the recording at or near the time point. In one embodiment, each fingerprint is a single numerical value that is a hashed function of multiple features. Other examples of fingerprints include spectral slice fingerprints, multi-slice fingerprints, LPC coefficients, cepstral coefficients, and frequency components of spectrogram peaks.

Fingerprints can be computed by any type of digital signal processing or frequency analysis of the signal. In one example, to generate spectral slice fingerprints, a frequency analysis is performed in the neighborhood of each landmark timepoint to extract the top several spectral peaks. A fingerprint value may then be the single frequency value of the strongest spectral peak. For more information on calculating characteristics or fingerprints of audio samples, the reader is referred to U.S. Patent Application Publication US 2002/0083060, to Wang and Smith, entitled "System and Methods for Recognizing Sound and Music Signals in High Noise and Distortion," the entire disclosure of which is herein incorporated by reference as if fully set forth in this description.

Thus, the sample analyzer 108 will receive a recording and compute fingerprints of the recording. The sample analyzer 108 may compute the fingerprints by contacting additional recognition engines. To identify the recording, the sample analyzer 108 can then access the database 112 to match the fingerprints of the recording with fingerprints of known audio tracks by generating correspondences between equivalent fingerprints and files in the database 112 to locate a file that has the largest number of linearly related correspondences, or whose relative locations of characteristic fingerprints most closely match the relative locations of the same fingerprints of the recording. That is, linear correspondences between the landmark pairs are identified, and sets are scored according to the number of pairs that are linearly related. A linear correspondence occurs when a statistically significant number of corresponding sample locations and file locations can be described with substantially the same linear equation, within an allowed tolerance. The file of the set with the highest statistically significant score, i.e., with the largest number of linearly related correspondences, is the winning file, and is deemed the matching media file.

As yet another example of a technique to identify content within the audio stream, an audio sample can be analyzed to identify its content using a localized matching technique. For example, generally, a relationship between two audio samples can be characterized by first matching certain fingerprint objects derived from the respective samples. A set of fingerprint objects, each occurring at a particular location, is generated for each audio sample. Each location is determined depending upon the content of a respective audio sample and each fingerprint object characterizes one or more local features at or near the respective particular location. A relative value is next determined for each pair of matched fingerprint objects. A histogram of the relative values is then generated. If a statistically significant peak is found, the two audio samples can be characterized as substantially matching. Additionally, a time stretch ratio, which indicates how much an audio sample has been sped up or slowed down as compared to the original audio track can be determined. For a more detailed explanation of this method, the reader is referred to published PCT patent application WO 03/091990, to Wang and Culbert, entitled Robust and Invariant Audio Pattern Matching, the entire disclosure of which is herein incorporated by reference as if fully set forth in this description.

In addition, systems and methods described within the publications above may return more than just the identity of an audio sample. For example, Wang and Smith may return, in addition to the metadata associated with an identified audio track, the relative time offset (RTO) of an audio sample from the beginning of the identified audio track. To determine a relative time offset of the audio recording, the fingerprints of the audio sample can be compared with fingerprints of the original files to which they match. Each fingerprint occurs at a given time, so after matching fingerprints to identify the audio sample, a difference in time between a first fingerprint (of the matching fingerprint in the audio sample) and a first fingerprint of the stored original file will be a time offset of the audio sample, e.g., amount of time into a song. Thus, a relative time offset (e.g., 67 seconds into a song) at which the sample was taken can be determined.

Thus, a user may send from a client device a content identification query to a sample analyzer, which may use any of the techniques described herein to identify the content. Within exemplary embodiments described below, the user's client device may only need to send information relating to a source of the content and a location of the client device to the sample analyzer to identify content to which the user is currently listening.

In an exemplary embodiment, the sample analyzer will perform a content identification for a song once, and then for future queries, which are received within a valid time window by other client devices listening to the same broadcast that are located in a geographic area for which the broadcast covers, the sample analyzer can return the previous content identification that was performed. Within a given geographic area, there is a limited number of radio broadcast stations, and if a geographic location of a user is known, then using the known location, broadcast information and a time of a query, the sample analyzer can identify a recording without having to perform computationally intensive identifications (as described above), but by referring to previous identifications made with for devices in the same locality.

As an example, if two users are trying to identify the same radio station content at about the same time, after the sample analyzer performs an identification of a first user's recording (using a method described above), then within an allowable time window (e.g., time duration of the previously identified song), the sample analyzer can return the same identification to a second user. During a time duration of the song, if another user within the same locality and listening to the same broadcast sends in a request, the sample analyzer will not have to do a computationally intensive identification, but rather, the sample analyzer can rely on the previous stored recognition. In this manner, there could be many queries to identify a song being broadcast on a radio station, and the sample analyzer may only have to perform one computationally intensive identification, store the identification and mark the identification as being valid for a given time fame.

Figure 2:
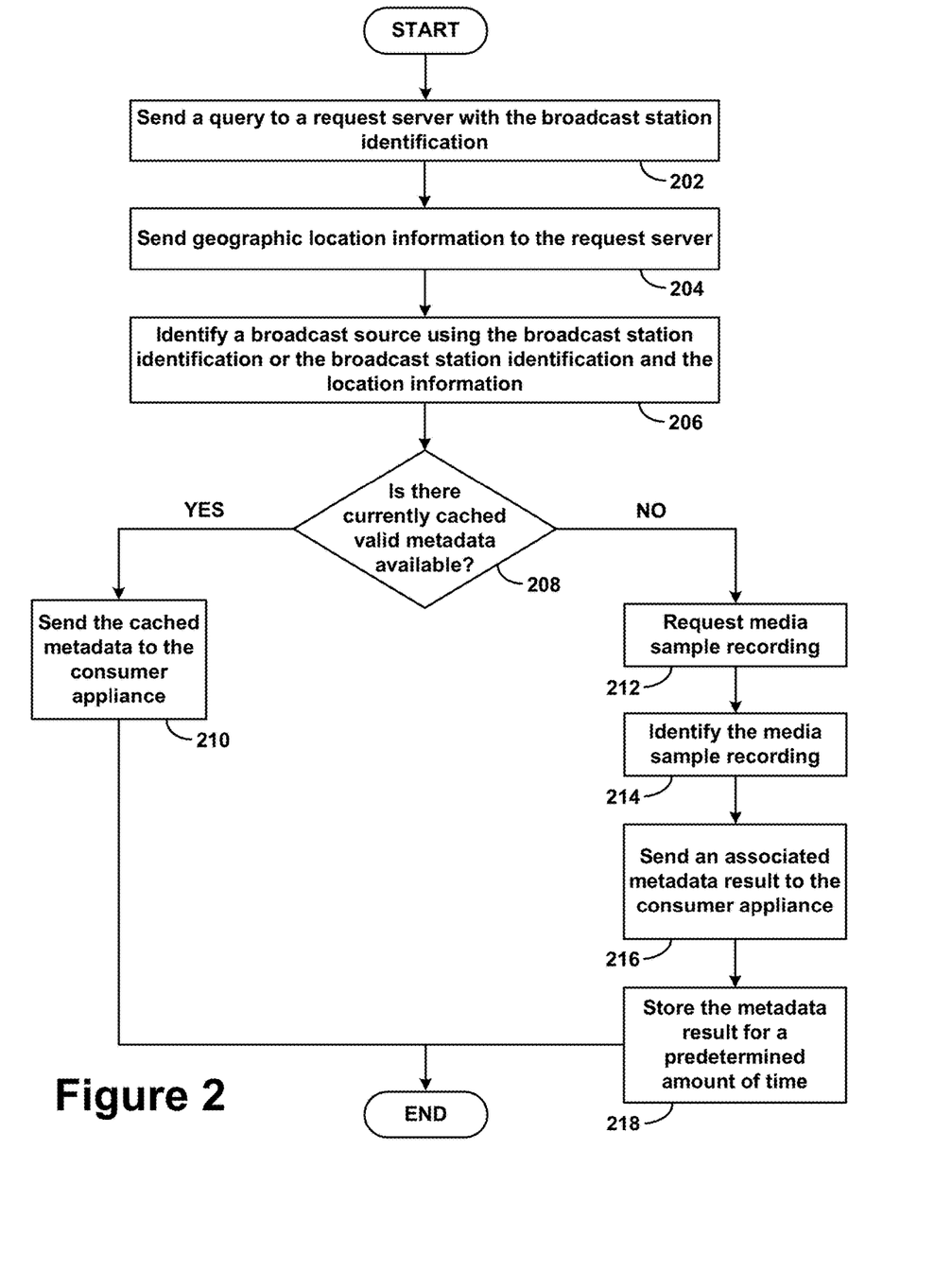
FIG. 2 is a flowchart depicting functional blocks of an example method of identifying content based on location of a user, broadcast information and/or stored content identifications.

FIG. 2 is a flowchart depicting functional blocks of an example method of identifying content based on location of a user, broadcast information and/or stored content identifications. Initially, a consumer appliance including a broadcast receiver can be used to listen to a broadcast station. A user can send a content identification query from the consumer appliance to a request server, providing at least a representation of a broadcast station to which the user is listening, as shown at block 202. The consumer appliance may also send location information to the request server to indicate a geographic location of the consumer appliance, as shown at block 204. If the broadcast station information is not unique, for example, if the broadcast station information is just a tuning frequency, the location information acts to disambiguate an exact broadcast station. Many radio stations broadcast in one area, and each has a distinct broadcast frequency, however, broadcast frequencies are reused throughout multiple areas. Thus, the request server uses either the broadcast frequency alone, or the broadcast frequency and the geographic location information to identify a unique broadcast source, as shown at block 206.

Next, the request server determines if there is currently cached metadata available for the selected broadcast station, as shown at block 208. Currently cached valid metadata will be available if a broadcast program has already been identified for a previous query on the selected broadcast station within a predetermined interval of time. If there is currently cached metadata available for the broadcast station, then the request server will return an associated cached metadata result to the consumer appliance, as shown at block 210. If no currently cached metadata is available, then the request server will request the consumer appliance to send a media sample representation to the request server, as shown at block 212. The request server then routes the media sample to a recognition server for an identification, and sends an associated metadata result back to the consumer appliance, as shown at blocks 214 and 216. The request server then caches (stores) the result as a currently cached metadata for the selected broadcast station for a predetermined length of time, during which the currently cached metadata is valid, as shown at block 218. Caching the current metadata makes it possible to serve requests to many more consumer appliances than would otherwise be possible if each request included a sample recording that had to be identified individually through a recognition server. Using the method in FIG. 2, each broadcast program on each broadcast station would only need to be identified once independent of how many consumer devices make requests because the initial identification is shared and used for all subsequent requests pertaining to the same broadcast program (e.g., for all subsequent requests received during the valid time period).

Figure 3:
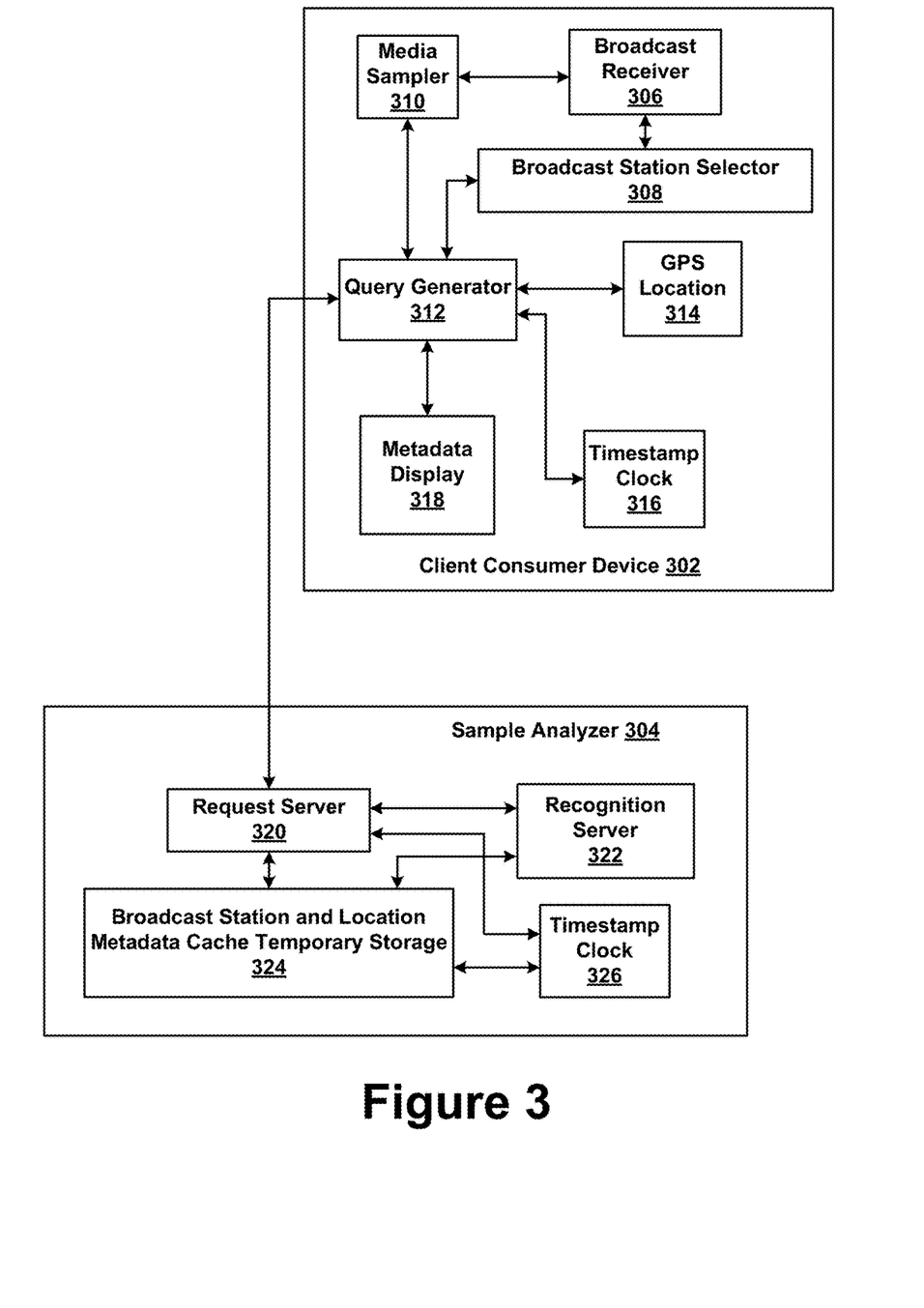
FIG. 3 is a block diagram illustrating an example client consumer device in communication with a sample analyzer to receive information identifying broadcast content.

FIG. 3 is a block diagram illustrating an example client consumer device 302 in communication with a sample analyzer 304 to receive information identifying broadcast content. The client consumer device 302 may be a personal computer, stereo receiver, set-top box, mobile phone, MP3 player, and may be able to communicate with the sample analyzer 304 via a wired or wireless data connection. The wired data connection could operate over Ethernet, DSL, ISDN, or conventional POTS telephone modem network. The wireless data connection may operate according to a short range wireless protocol, such as the Bluetooth® protocol, WiFi or WiMax, or according to a long range wireless protocol, such as CDMA, GSM, or other wireless networks.

The client consumer device 302 includes a broadcast receiver 306, a broadcast station selector 308, a media sampler 310, a query generator 312, a global positioning system (GPS) location device 314, a timestamp clock 316 and a display 318.

The broadcast receiver 306 may be any type of general FM/AM transmitter/receiver (or XM satellite radio receiver) to receiver broadcasts from a radio station. The broadcast receiver 306 may even receive an Internet streaming digital broadcast. The broadcast station selector 308 is coupled to the broadcast receiver 306 and is able to tune to a specific broadcast frequency (so as to only pass one radio frequency) to an amplifier and loudspeaker (not shown) to be played for a user. The broadcast station selector 308 may provide a text string representing a broadcast channel or an Internet address, such as a URL, that represents the broadcast channel. Alternatively, the broadcast station selector 308 may specify a number indicating a tuning frequency. The tuning frequency may be used by the broadcast receiver 306 to set an analog, digital, or software tuner, or to access an Internet network address to access a specific broadcast program.

The media sampler 310 is coupled to the broadcast receiver in order to record a portion of a broadcast. A segment of an audio program a few seconds long may be sampled digitally into a file as a numeric array by the media sampler 310. In an optional step of processing, the media sample may be further processed by compression. Alternatively, the raw media sample may be processed through a feature extractor to pull out relevant features for content identification. One feature extractor known in the art is taught by Wang and Smith, U.S. Pat. No. 6,990,453, which is entirely incorporated by reference, in which a list of spectrogram peaks in time and frequency is extracted from an audio sample. Another suitable feature extraction method known in the art is disclosed by Haitsma, et al, in U.S. Patent Application Publication Number 2002/0178410, which entirely incorporated herein by reference. Feature extraction and compression are not required, but can be used by the media sampler 310 to reduce an amount of data that is transmitted to the sample analyzer 304, thus saving time and bandwidth costs.

The query generator 312 may also send a geographic location of the client consumer device 302 along with the query, and may receive the geographic location from the GPS device 314. The mechanism by which the GPS device 314 determines a position of the client consumer device 302 can be device-based and/or network based. In a device-based system, the GPS device 314 is a GPS receiver for receiving from a GPS satellite system an indication of the client consumer device's current position. In a network-based system, the GPS device 314 may send a position determination request into a wireless network, and the network may respond to the GPS device 314 by providing the GPS device 314 with an indication of the GPS device's position. (In this regard, the network may determine the GPS device's position by querying the GPS device according to the specification "Position Determination Service Standard for Dual Mode Spread Spectrum Systems," TIA/EIA/IS-801, published in October 1999 and fully incorporated herein by reference, which defines a set of signaling messages between a device and network components to provide a position determination service so as to determine a location of the device.

Alternatively, in a network-based system, the GPS device 314 may operate via a reverse-lookup protocol using an IP address of the client consumer device 302 to obtain an approximate location. The IP address of the client consumer device 302 may be assigned by a network provider, and a geographic location of the IP address can be included within registration information of the owner of the IP address. Either the IP address of the client consumer device 302 or an IP address of a gateway in the path to the server may be used. In this case, the GPS device 314 can provide sufficient information to indicate an approximate position by sending its IP address, and the derivation of the position may be performed at the client consumer device 302 or at the sample analyzer 304. The IP address will include information from which a location can be ascertained, or may even include a reference number indicative of a physical location.

The GPS device 314 is optional and is only used if the broadcast station selector 306 does not uniquely specify a broadcast station. For example, if the broadcast station selector 306 only specifies a tuning frequency, rather than a tuning frequency and additional information pertaining to a broadcast station (e.g., such as a broadcast station name). Location information disambiguates the broadcast station since only one station in a geographical vicinity may use the same frequency. For purposes of the present application, accuracy of the GPS device 314 does not need to be extremely high. Other means for localization may be employed, working in conjunction with the sample analyzer 304, such as triangulation through mobile phone data network transmission towers. For fixed location consumer appliances such as a set-top box, the location information may be specified by a zip code or a residential address stored in a data string, for example.

A user may then use the query generator 312 to send a content identification query to the sample analyzer 304 to receive information pertaining to the identity of the content. The query generator 312 may also send a timestamp from the timestamp clock 316 along with the query. The sample analyzer 304 will return metadata to the client consumer device 302 for display on the metadata display 318, which may be any typical display device.

The sample analyzer 304 includes a request server 320, a recognition server 322, a metadata cache temporary storage 324 and a timestamp clock 326. The request server 320 receives content identification queries from the client consumer device 302 and returns metadata pertaining to an identification of the content. The recognition server 322 operates to perform a computational identification of an audio sample, using any of the methods described herein, such as those described within Kenyon, U.S. Pat. No. 5,210,820. The recognition server 322 will also identify a real-time offset of the audio sample from the original recording, as described within U.S. Patent Application Publication US 2002/0083060, to Wang and Smith, to determine a time for which the identification of the audio sample is valid and may be returned in response to future queries.

The request server 320 and/or the recognition server 322 can estimate endpoints of the broadcast program by noting a timestamp of a beginning of the media sample and subtracting off the relative time offset (RTO) to obtain a segment start time, and then further adding a length of the broadcast program (known after making the content identification) to obtain a segment end time. The segment start and end times can be used to calculate a time interval of validity during which the cached metadata for the identified broadcast program is valid. For example, if the RTO indicates that the sample is 50 seconds into the song, and after making the content identification, the identity and length of the song is known, and thus, the time remaining for which the song will be played can be calculated. If another user were to send in a content identification query for the same broadcast station during the remaining time for which the song will be played, then no computational identification is necessary because it is known that the same song is still being played and the identity of the song has already been determined and stored. In this instance, the request server 320 would simply return the previously stored identity of the song.

When a computational identity is needed, the recognition server 322 may return in addition to usual metadata identifying the song both a relative time offset from the beginning of the identified broadcast program corresponding to the start of the media sample and a length of the identified broadcast program. The recognition algorithms by Wang and Smith or by Haitsma, et al, (references cited above) can provide such information. The recognition server 322 will then note the broadcast station from which the sample was recorded, and then store all the information in the metadata cache 324, in a format as shown in Table 1 below, for example.

TABLE 1

| Broadcast Station | Content Identification | Time of Validity |
|---|---|---|
| 104.5 WMQD (San Francisco) | "name of song" | Valid for the next 3:30 |

As shown in Table 1, the metadata cache 324 may correlate content identifications (e.g., names of song) with a broadcast station and a time of validity. The time of validity indicates how long the content identification for the specified broadcast station is valid. For example, the time of validity may be a remaining length of the song, so that if another user sends in a query for this broadcast station during the time of validity (e.g., during broadcast of the same song), then the content identification of the song is still valid and is still correct. The time of validity may also be a time corresponding to a length of the song, and the request server 320 will then note the timestamp in the content identification request to determine if the cached metadata is still valid.

The request server 320 will receive the content identification query from the client consumer device 302, identify a broadcast station from the query and determine if there is a currently cached metadata result available and valid for the selected broadcast station within the metadata cache 324. As explained, currently cached metadata will be available if the recognition server 322 has already identified the broadcast program on the selected broadcast station within a predetermined interval of time in the past.

If there is currently cached metadata available for the selected broadcast station, then the request server 320 returns the associated cached metadata content identification result to the client consumer device 302. Furthermore, the time interval of validity, or at least an endpoint of a song may also be returned in the metadata to the client consumer device 302. The client consumer device 302 can then synchronize update times indicating when to next query the request server 320 for an identity of the next song (e.g., which will start after the end of the previous time interval of validity), thus minimizing a delay in updating program metadata between broadcast programs.

If no currently cached metadata is available and valid for the selected broadcast station, then request server 320 will request the client consumer device 302 to send a media sample representation to the request server 320 for identification. The request server 320 will route the media sample to the recognition server 322, which performs a computational identification and sends an associated metadata result back to the request sever 320 that forwards the result back to the client consumer device 302. The request server 320 will also cache the result as the currently cached metadata for the selected broadcast station, and store a predetermined length of time during which the currently cached metadata is valid. Caching of the current metadata enables the request server 320 to serve requests from many more consumer appliance clients than would otherwise be possible if each request had to be computational identified individually through the recognition server 322.

Figure 4:
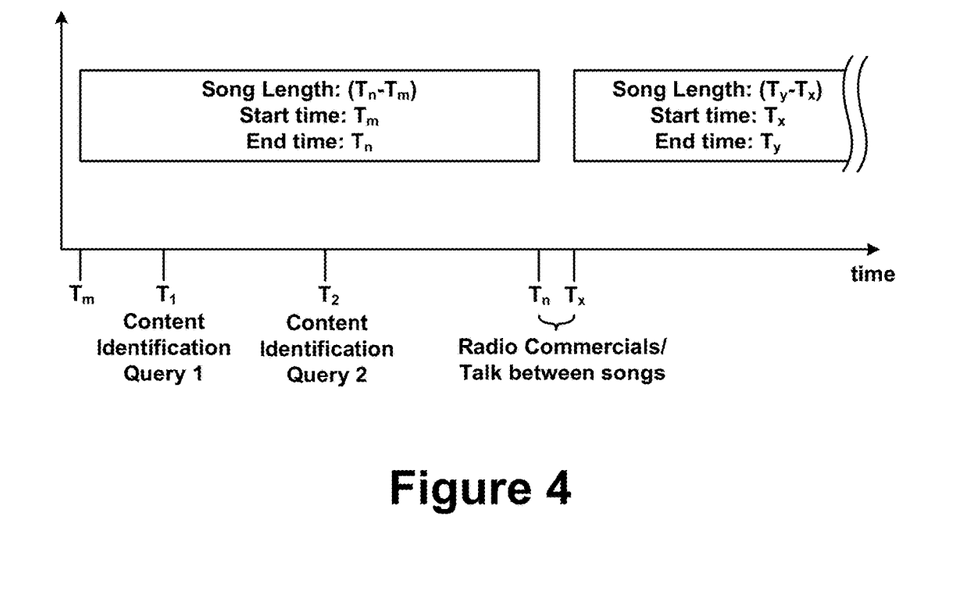
FIG. 4 illustrates a conceptual example of multiple content identification queries occurring serially in time during a song.

FIG. 4 illustrates a conceptual example of multiple content identification queries occurring serially in time during a song. As shown, a first song is being broadcast by a radio station at a start time $T_m$ and the song has an end time of $T_n$ and thus a length of $(T_n-T_m)$. A first content identification query is received at time $T_1$, which is after the start of the first song, and so the content identification query is performed to identify the first song. The identity of the first song is then stored, and sent to a device requesting the first query. Once a second content identification is received at time $T_2$, which is before the end time $T_n$ of the first song, then the stored information pertaining to a response that was sent to the first query is also sent in response to the second query. No second or additional computational content identification is needed. For all content identification queries received after the first query (e.g., time $T_1$) and before the end of the song (e.g., time $T_n$), the result from the first computational content identification is returned.

As mentioned above, the client consumer device 302 can synchronize update times indicating when to next query the request server 320 for an identity of the next song (e.g., which will start after the end of the previous time interval of validity or soon thereafter) to minimize a delay in updating program metadata between broadcast programs. In the example shown in FIG. 4, the next song begins broadcasting at a time $T_x$, and thus during the time $T_n$ to $T_x$ no songs are broadcast. For example, during the time $T_n$ to $T_x$, a broadcast station may air commercials or DJ talk. Thus, a client consumer device may be programmed to next query for content identification at least a few seconds after the end time of the previously identified song.

Figure 5:
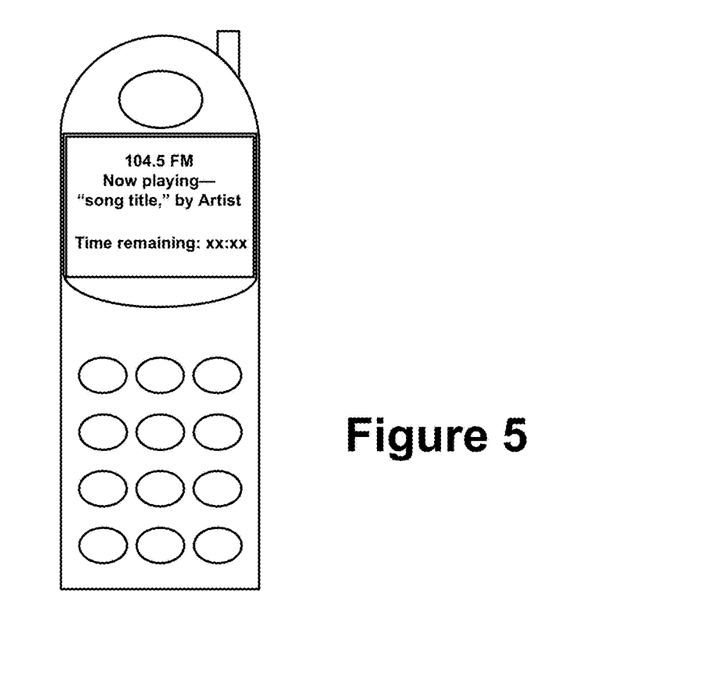
FIG. 5 illustrates an example display of broadcast metadata on a mobile phone.

To that end, a client consumer device may programmatically (or automatically) query the request server 320 to receive content identifications of every song being broadcast and received at the client consumer device so as to constantly received updated program metadata. In this manner, a user listening to a radio station will know the identity of all songs being played, and will not have to manually create or send a content identification query to the request server 320. Metadata may also be automatically displayed on a client consumer device, while a broadcast receiver application is open and operating. For example, FIG. 5 illustrates an example display of broadcast metadata on a mobile device. The display may indicate radio station information (104.5 FM), a song title, an artist name, and a time remaining for the song. Other information may also be displayed as well. The mobile device may continually receive new metadata with new information pertaining to a current song being played, and may update the display accordingly. The metadata update may be sent in response to a query by the client consumer device 302, or alternatively may be pushed proactively by the sample analyzer 304 to the client consumer device 302, as long as the client consumer device 302 continues to indicate that it is still tuned to the same broadcast station. In this manner, the data can be sent without a request to continue updating the metadata information.

The client consumer device 302 sends broadcast station information to the sample analyzer 304 and the sample analyzer 304 usually will be able to discern to which broadcast station the client consumer device 302 is listening based on the information. The sample analyzer may also attempt to determine a broadcast source by using external monitoring systems. For example, samples from broadcast channels may be monitored and each broadcast sample may be time stamped in terms of a "real-time" offset from a common time base, and an estimated time offset of the broadcast sample within the "original" recording is determined (using the technique of Wang and Smith described in U.S. Patent Application Publication US 2002/0083060, the entire disclosure of which is herein incorporated by reference). Then user sample characteristics received by the sample analyzer 304 can be compared with characteristics from broadcast samples that were taken at or near the time the user sample was recorded to identify a match. If the real-time offsets are within a certain tolerance, e.g., one second, then the user audio sample is considered to be originating from the same source as the broadcast sample, since the probability that a random performance of the same audio content (such as a hit song) is synchronized to less than one second in time is low. Additional factors may also be considered when attempting to find a match to a broadcast source the audio sample. For example, to further verify that the user is actually listening to a given broadcast channel, and that it is not just a coincidence (such as a user taking a recording from a CD player), user samples can be taken over a longer period of time, e.g., longer than a typical audio program, such as over a transition between audio programs on the same channel to verify continuity of identity over a program transition as an indicator that the correct broadcast channel is being tracked.

However, if the broadcast selection selector 308 of the client consumer device 302 does not uniquely describe a single broadcast station, then location information from the GPS device 314 is also sent along with the query (either within the query message or as a separate message) to the request server 320. The request server 320 may then access the metadata cache 324 and identify a broadcast station that broadcasts within an area of the location of the client consumer device 302. For example, the request server 320 can look to a table, such as Table 1, to verify that station "104.5" broadcasts to San Francisco, which is where the client consumer device 302 may be located, and return the metadata result describing the program playing at the time.

In the event that the request server 320 cannot locate a metadata result corresponding to the received broadcast station selector 308 information and the location information, the request server 320 will ask the client consumer device 302 to send a media sample representation to identify the sample. The recognition server 322 will then computationally identify the sample and return a metadata result. The metadata result is then sent to the client consumer device 302 and displayed to a user.

Figure 6:
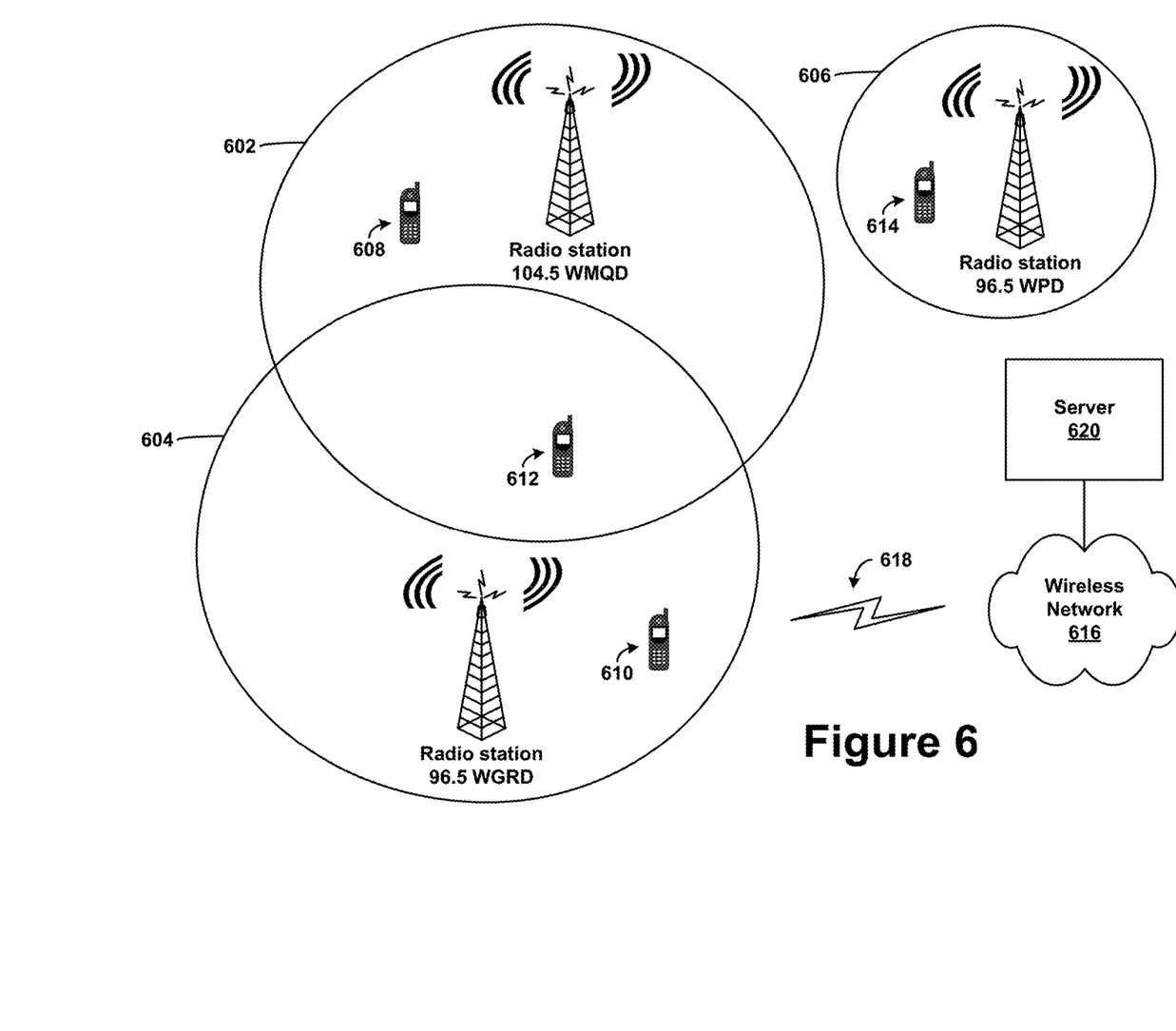
FIG. 6 illustrates a conceptual block diagram of an example coverage area map for two radio stations.

In the cases described above in which a terrestrial broadcast is being monitored and the broadcast station selector 308 does not uniquely specify a broadcast station (e.g., only the tuning frequency is specified), an optional means for location may be used in conjunction with a map of known physical broadcast stations and corresponding coverage areas to ascertain to which station the client device is tuned, based on the assumption that reception is limited to a coverage area in proximity to the broadcast station. FIG. 6 illustrates a conceptual block diagram of a coverage area map for two radio stations. In the example shown in FIG. 6, Radio Station 104.5 WMQD has a coverage area 602, Radio Station 96.5 WGRD has a coverage area 604, and a second Radio Station 96.5 WGRD has a coverage area 606. Mobile device 608 is within coverage area 602 and mobile device 610 is within coverage area 604 while mobile device 612 is within both coverage areas 602 and 604. Mobile device 614 is within coverage area 606.

The mobile devices may send a content identification query through a wireless network 616 via a wireless link 618 to a server 620, which includes functionality and/or components comprising a sample analyzer, as described above in FIG. 3, to identify broadcast content received from the Radio Stations. The server 620 may have the map, as shown in FIG. 6, of the coverage areas of the Radio Stations, and using location information received from the mobile devices, can determine to which radio station the mobile device is listening. However, for mobile devices 610, 612 and 614, the server 620 may also require additional information, such as the location of the mobile device, because the frequency information alone will not be enough to distinguish the radio stations.

In another embodiment involving client consumer devices tuning to terrestrial broadcast stations, and in which a GPS receiver (or functional equivalent) is present within the devices, a self-organizing broadcast station mapping system may be derived if no map of physical broadcast stations is available. Initially, it is not known where each broadcast radio station is located, however, it is desired to determine for each broadcast station its coverage area. A coverage map may be formed from many samples taken by many client consumer appliances over a period of time. Referring back to FIG. 3, to construct a coverage area map, each query received at the request server 320 may include a tuning frequency, a GPS location, and a media sample. Each query is initially routed to the recognition server 322 for identification of the metadata using the computational identification technique. If two queries are made using the same frequency, and the media sample from one request temporally overlaps the time interval of validity resulting from the other request, then the metadata is checked to see if the identified programs correspond to each other. This is performed, for example, by determining if the metadata match, and then a temporal correspondence is verified for example by determining whether the time intervals of validity match. If both media samples are determined to be the same, then the request server 320 will have two geographic locations to which the tuning frequency broadcasts (e.g., if the metadata and the intervals match, then the two users are declared to be tuned to the same unknown broadcast station).

The two corresponding GPS locations are grouped into a set of locations belonging to the unknown broadcast station that have the same broadcast station selector (e.g. tuning frequency). A coverage map may be generated from the set of locations by convolving with a disc of predetermined radius, e.g., 0.5 or 1 Kilometer. In other words, a locality zone of predetermined radius is drawn around each point in the set of locations. Each unknown broadcast station is thus associated with a corresponding coverage map, and furthermore, is associated with currently cached metadata from the most recent recognition of a media sample associated with the unknown broadcast station. When a query is made with a broadcast station selector and a new GPS location, a search is performed to find a broadcast station that has the same broadcast station selector and coverage map that overlaps the GPS location. If a match is found and a current metadata is available for that group, then a media identification by the recognition server is not performed and the current metadata is returned. Otherwise, a media identification is performed by the recognition server and the resulting metadata becomes the currently cached metadata for that broadcast station.

If a new non-overlapping GPS location is encountered (e.g., the location is not within the previously generated coverage area map) and the query does not match a known broadcast station and an associated coverage map, then a media identification is performed. If the resulting metadata and time interval of validity matches that of a known broadcast station that has the same broadcast station selector (e.g., tuning frequency), then the new GPS location can be added to that broadcast station's set of locations and the associated coverage map can be updated. If no matching broadcast station is found, then a new record for a new broadcast station would be generated.

Using the methods described herein, raw audio samples received from broadcast stations can be identified using known computational identification techniques, and the identification can be stored and returned to subsequent queries associated with the same broadcast source during a time of validity. If many users are listening to the same broadcast program and are making the same query, much time can be saved by performing one computational audio pattern recognition and returning the result to all users, rather than performing a computational identification of content for every user (when doing so will repeat many identifications).

Many embodiments have been described as being performed, individually or in combination with other embodiments, however, any of the embodiments described above may be used together or in any combination to enhance certainty of identifying samples in the data stream. In addition, many of the embodiments may be performed using a consumer device that has a broadcast stream receiving means (such as a radio receiver), and either (1) a data transmission means for communicating with a central identification server for performing the identification step, or (2) a means for carrying out the identification step built into the consumer device itself (e.g., an audio recognition means database could be loaded onto the consumer device). Further, the consumer device may include means for updating a database to accommodate identification of new audio tracks, such as an Ethernet or wireless data connection to a server, and means to request a database update. The consumer device may also further include local storage means for storing recognized segmented and labeled audio track files, and the device may have playlist selection and audio track playback means, as in a jukebox, for example.

The methods described above can be implemented in software that is used in conjunction with a general purpose or application specific processor and one or more associated memory structures. Nonetheless, other implementations utilizing additional hardware and/or firmware may alternatively be used. For example, the mechanism of the present application is capable of being distributed in the form of a computer-readable medium of instructions in a variety of forms, and that the present application applies equally regardless of the particular type of signal bearing media used to actually carry out the distribution. Examples of such computer-accessible devices include computer memory (RAM or ROM), floppy disks, and CD-ROMs, as well as transmission-type media such as digital and analog communication links.

While examples have been described in conjunction with present embodiments of the application, persons of skill in the art will appreciate that variations may be made without departure from the scope and spirit of the application. For example, although the broadcast data-stream described in the examples are often audio streams, the invention is not so limited, but rather may be applied to a wide variety of broadcast content, including video, television, internet streaming, or other multimedia content. As one example, video files may be identified using similar techniques for identifying audio files including scanning a video file to find digital markings (e.g., fingerprints) unique to the file, and checking a database of videos to identify videos that have similar markings. Fingerprint technology can identify audio or video by extracting specific characterization parameters of a file, which are translated into a bit string or fingerprint, and comparing the fingerprints of the file with the fingerprints of previously stored original files in a central database. For more information on video recognition technologies, the reader is referred to U.S. Pat. No. 6,714,594, entitled "Video content detection method and system leveraging data-compression constructs," the contents of which are herein incorporated by reference as if fully set forth in this description.

Further, the apparatus and methods described herein may be implemented in hardware, software, or a combination, such as a general purpose or dedicated processor running a software application through volatile or non-volatile memory. The true scope and spirit of the application is defined by the appended claims, which may be interpreted in light of the foregoing.

What is claimed is:

1. A method of identifying an audio content sample and determining a broadcast station source for a broadcast, including:
    monitoring a plurality of broadcast stations and identifying broadcast audio content from the broadcast stations as the broadcast audio content is received;
    caching to memory fingerprints of the identified broadcast audio content from the plurality of broadcast stations;
    receiving a sampled audio content;
    matching fingerprints of the sampled audio content against:
        the cache of fingerprints from the identified broadcast audio content; and
        a database of audio content;
    identifying the sampled audio content and, when the sampled audio content originates from a broadcast, a broadcast station source that was sampled;
    receiving a location from a portable device; and
    using at least the location and the identified sampled audio content to target the portable device for advertising or offers,
    wherein if the matching of the fingerprints of the sampled audio content against the cache succeeds, bypassing matching against the database.

2. The method of claim 1, wherein the sampled audio content is received from the portable device.

3. The method of claim 1, wherein the sampled audio content is received from the portable device and further including:
    using the location to validate an identity of the broadcast station source.

4. The method of claim 1,
    wherein the sampled audio content is received from the portable device and further including:
        using at least the location and the identified broadcast station source to target the portable device for advertising or offers.

5. The method of claim 1, wherein:
    the identified sampled audio content is an advertisement; and
    further including using at least the identified sampled audio content and the identified broadcast station source to target the portable device for advertising or offers.

6. The method of claim 1, wherein receiving the sampled audio content includes receiving fingerprints from the portable device.

7. The method of claim 1, further including creating fingerprints from the received sampled audio content.

8. The method of claim 1, further including sending at least some data regarding the identified sampled audio content to the portable device.

9. A method of identifying an audio content sample from a real time broadcast, including:
monitoring a plurality of broadcast stations and identifying broadcast audio content from the broadcast stations as the broadcast audio content is received;
wherein monitoring at least one broadcast station of the plurality of broadcast stations relies on a web-based feed that is delayed from an over-the-air feed from the same broadcast station;
caching fingerprints of the identified broadcast audio content from the plurality of broadcast stations;
receiving sampled audio content from a portable device;
receiving a location from the portable device;
matching the fingerprints of the sampled audio against the cache of fingerprints;
identifying the sampled audio content by matching fingerprints of the sampled audio content against a database of audio broadcast content;
wherein if the matching of the fingerprints of the sampled audio content against the cache succeeds, bypassing matching against the database;
wherein matching the fingerprints of the sampled audio content against the database of audio broadcast content is limited by a delay bound; and
combining the location and the identified sampled audio content to identify a broadcast station source which the portable device sampled.

10. The method of claim 9, wherein:
the identified sampled audio content is an advertisement;
further including using at least the identified sampled audio content and the identified broadcast station source to target the portable device for advertising or offers.

11. The method of claim 9, further including:
generating and saving playlists of the broadcast audio content from the broadcast stations monitored; and
sending the portable device at least a recent portion of the playlist that identifies a plurality of items broadcast by the identified broadcast station source.

12. A method of identifying an audio content sample that originates from an actual broadcast, including:
monitoring a plurality of broadcast stations, fingerprinting and saving the fingerprints of broadcast audio content in a database of broadcast content as the broadcast audio content is received;
identifying at least some of the broadcast audio content from the broadcast stations against a database of pre-indexed audio content and caching fingerprints of the identified broadcast audio content as the identified broadcast audio content is received;
receiving sampled audio content from a portable device;
matching the fingerprints of the sampled audio content against:
the cache of fingerprints for the identified broadcast audio content;
the database of broadcast content; and
the database of pre-indexed audio content; and
identifying a broadcast station source of the sampled audio content that originates from an actual broadcast and, when the sampled audio content can be found in the database of pre-indexed audio content, identifying the sampled audio content.

13. The method of claim 12, further including:
receiving a location from the portable device; and
using the location to validate an identity of the broadcast station source.

14. The method of claim 12, further including:
receiving a location from the portable device; and
using at least the location and the identified sampled audio content to target the portable device for advertising or offers.

15. The method of claim 12, wherein:
the monitoring of at least one broadcast station relies on a web-based feed that is delayed from an over-the-air feed from the same broadcast station; and
matching the fingerprints of the audio content sample against the cache is limited by a delay bound.

16. The method of claim 12, further including:
generating and saving playlists of the broadcast audio content from the broadcast stations monitored; and
sending the portable device at least a recent portion of the playlist that identifies a plurality of recent items broadcast by the identified broadcast station source.

17. A method of identifying an audio content sample and determining a broadcast station, comprising:
monitoring a plurality of broadcast stations and automatically identifying broadcast audio content from the broadcast stations as the broadcast audio content is received;
wherein monitoring at least one broadcast station of the plurality of broadcast stations relies on a web-based feed that is delayed from an over-the-air feed from the same broadcast station;
caching to memory fingerprints of the identified broadcast audio content from the plurality of broadcast stations;
receiving a sampled audio content;
matching fingerprints of the sampled audio content against:
the cache of fingerprints from the identified broadcast audio content; and
a database of audio content;
wherein matching the fingerprints of the sampled audio content against the database of broadcast audio content is limited by a delay bound; and
identifying the sampled audio content and, when the sampled audio content originates from a broadcast, a broadcast station source that was sampled,
wherein if the matching of the fingerprints of the sampled audio content against the cache succeeds, bypassing matching against the database.

18. The method of claim 17, further including:
receiving a location from the portable device; and
using the location to validate an identity of the broadcast station source.

19. The method of claim 17, further including:
generating and saving playlists of the broadcast audio content from the broadcast stations monitored; and
sending the portable device at least a recent portion of the playlist that identifies a plurality of recent items broadcast by the identified broadcast station source.

20. A method of identifying an audio content sample and determining a broadcast station source for a broadcast, including:
monitoring a plurality of broadcast stations and automatically identifying broadcast audio content from the broadcast stations as it is received;
caching to memory fingerprints of the identified broadcast audio content from the plurality of broadcast stations;
receiving a sampled audio content from a portable device;
matching fingerprints of the sampled audio content against:

the cache of fingerprints from the identified broadcast audio content;
and a database of audio content; and
identifying the sampled audio content and, when the sampled audio content originates from a broadcast, a broadcast station source that was sampled;
generating and saving playlists of the broadcast audio content from the broadcast stations monitored; and
sending the portable device at least a recent portion of the playlist that identifies a plurality of recent items broadcast by the identified broadcast station source,
wherein if the matching of the fingerprints of the sampled audio content against the cache succeeds, bypassing matching against the database.

21. The method of claim 20, wherein the sampled audio content is received from a portable device and further including:
receiving a location from the portable device; and
using the location to validate an identity of the broadcast station source.

22. A method of identifying an audio content sample and determining a broadcast station source for a broadcast, including:
monitoring a plurality of broadcast stations and automatically identifying broadcast audio content from the broadcast stations as it is received;
caching to memory fingerprints of the identified broadcast audio content from the plurality of broadcast stations;
receiving a sampled audio content;
matching fingerprints of the sampled audio content against the database of broadcast audio content and a database of audio content; and
identifying the sampled audio content and, when the sampled audio content originates from a broadcast, a broadcast station source that was sampled,
wherein if the matching of the fingerprints of the sampled audio content against the database of broadcast audio content succeeds, bypassing matching against the database of audio content.

23. The method of claim 22, further including:
receiving a location from a portable device; and
using the location to validate an identity of the broadcast station source.

24. A method of identifying an audio content sample from a real time broadcast, including:
monitoring a plurality of broadcast stations and identifying broadcast audio content from the broadcast stations as the broadcast audio content is received;
caching fingerprints of the identified broadcast audio content from the plurality of broadcast stations;
receiving sampled audio content from a portable device;
receiving a location from the portable device;
matching the fingerprints of the sampled audio against the cache of fingerprints;
identifying the sampled audio content by matching fingerprints of the sampled audio content against a database of audio content; and
wherein if the matching of the fingerprints of the sampled audio content against the cache succeeds, bypassing matching against the database;
combining the location and the identified sample audio content to identify a broadcast station source which the portable device sampled; and
using at least the identified broadcast station source to target the portable device for advertising or offers.

25. The method of claim 24, wherein:
the identified sampled audio content is an advertisement;
further including using at least the identified sampled audio content and the identified broadcast station source to target the portable device for advertising or offers.

26. The method of claim 24, further including:
generating and saving playlists of the broadcast audio content from the broadcast stations monitored; and
sending the portable device at least a recent portion of the playlist that identifies a plurality of items broadcast by the identified broadcast station source.

* * * * *